United States Patent [19]

Müller

[11] 4,217,700
[45] Aug. 19, 1980

[54] PROCESS FOR DRYING FILTRATION RESIDUE

[75] Inventor: Hans Müller, Erlenbach, Switzerland

[73] Assignee: Chemap AG, Maennedorf, Switzerland

[21] Appl. No.: 965,914

[22] Filed: Dec. 4, 1978

[30] Foreign Application Priority Data

Dec. 16, 1977 [CH] Switzerland .................. 15500/77

[51] Int. Cl.³ ............................................. F26B 7/00
[52] U.S. Cl. ......................................... 34/19; 34/22; 34/26; 210/68
[58] Field of Search ................. 34/19, 22, 26, 17; 210/68

[56] References Cited

U.S. PATENT DOCUMENTS

| | | | |
|---|---|---|---|
| 3,233,734 | 2/1966 | Muller | 210/68 X |
| 3,251,469 | 5/1966 | Muller | 210/68 X |
| 3,360,869 | 1/1968 | Muller | 210/68 |
| 4,116,831 | 9/1978 | Keat | 34/22 |

*Primary Examiner*—John J. Camby
*Attorney, Agent, or Firm*—Michael J. Striker

[57] ABSTRACT

A process for drying solid residues obtained in filtration processes, in which the residue is first dried by passing a gas through it while it is still on the filter elements, and then whirl drying the residue in a lower portion of the reaction vessel. A system in which the drying gas is circulated is described. This results in a process which permits the preparation of dry filter residues which are easily transportable and avoids problems of separation from the filter elements while still wet.

8 Claims, 1 Drawing Figure

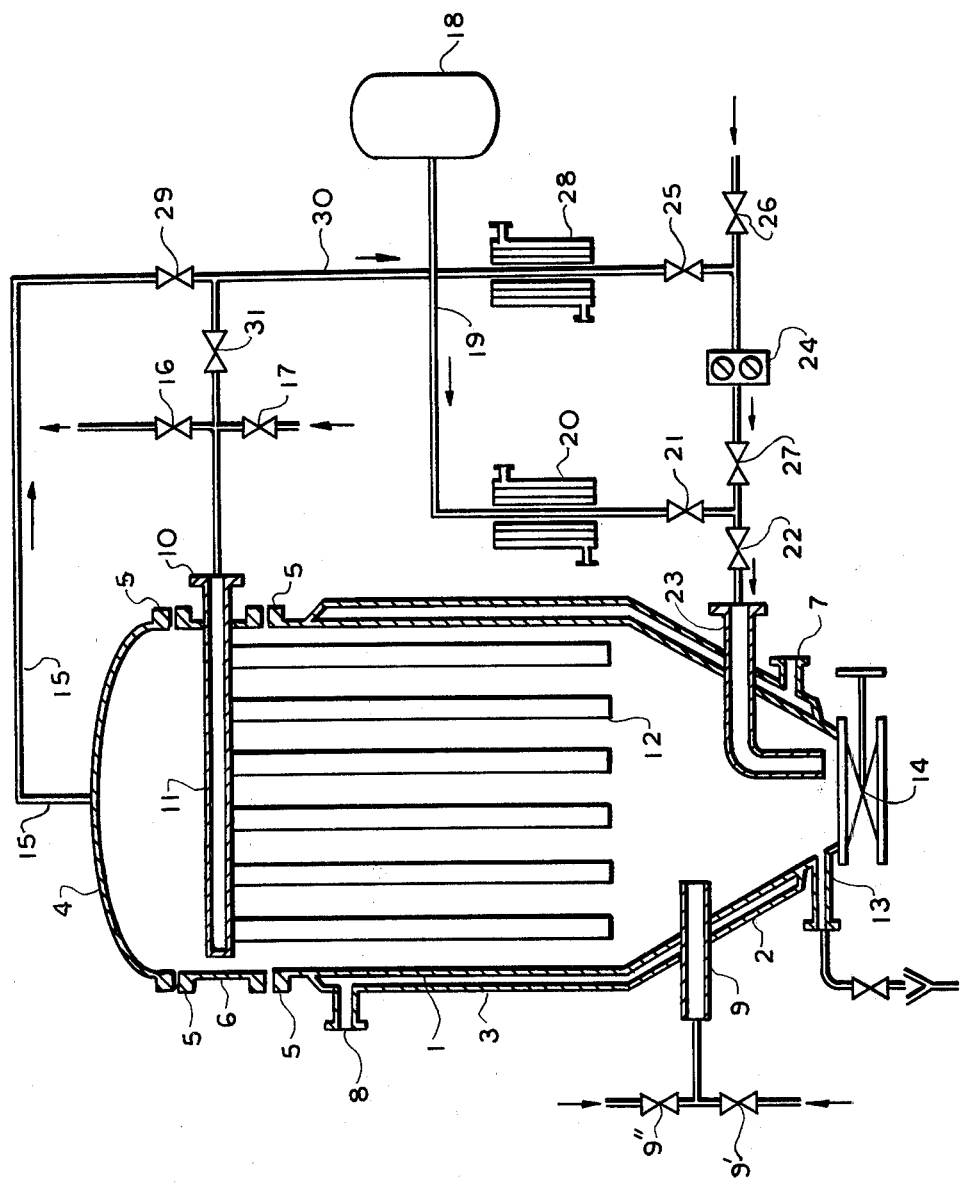

PROCESS FOR DRYING FILTRATION RESIDUE

BACKGROUND OF THE INVENTION

The invention is in the field of industrial processes for drying the solid residue of filtration processes.

Such filtration residues as dyes, pigments, metal hydroxides, catalysts and many others have generally been dried within the filter itself. The known processes for drying these residues on horizontal filter plates generally employ heated air or inert gases, which are passed through the filtrate inlet and dry the filtration residue in passing through the residue.

A disadvantage of this process is that the filtration residue has a tendency to cake up, making removal of the residue from the filter as well as transport of the residue out of the filtering tank difficult.

Similar results are found with the use of alluvial matting filter candles; however, the filter cakes tend to crack more readily as air is passed through the filter candles, and the air would tend to follow the path of least resistance through the filtration residue, minimizing the effectiveness of drying.

In the Swiss Pat. No. 569,503, a process has been disclosed in which the residue is homogenized within the filtration apparatus while still wet (i.e., before the passage of air through the residue to dry it). The drying process itself is performed elsewhere.

SUMMARY OF THE INVENTION

It is an object of the invention to overcome the prior art disadvantages and devise a process for drying the filtration residue within the filtration vessel used, employing the above-noted filter candle as filter elements.

This is achieved by drying the residue within the filtration vessel, first by passage of gas through the residue before the removal from the filter elements and then by a whirl drying process after its removal from the filter elements. Thus, a portion of the filtration vessel is also used as a whirl drying apparatus. Either air or an inert gas may be used in the whirl drying procedure; the gas may be dried either by chemical means or through known procedures for condensing the moisture in the starting gas. In general, warm gas may be used and then dried before reuse.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The sole FIGURE is a diagrammatic vertical section of a preferred embodiment of a filtration vessel employing the above-noted filter candles.

DESCRIPTION OF A PREFERRED EMBODIMENT

In a preferred embodiment, the filtration apparatus may consist of a cylindrical vessel 1 with a conical lower portion 2; it may include a second external casing 3. A cover 4 is attached through means such as flanges or sockets 5 held in place by a spacer 6. Heating or cooling media may be introduced through the external casing 3 by means of an inlet 7 and leaves the system through an outlet 8. The suspension to be filtered may be introduced into the conical portion of the filtration vessel by means of a duct 9. A valve may be supplied for controlling the flow of the suspension, such as 9', as well as for controlling the flow of a gas with the solution, as 9". The solution passes through filter candles 12 which are connected in the per se known manner to one or more header collectors 11. The header collector or collectors are then connected to a filtrate outlet 10. At the bottom of the conical section 2 is located a sliding cover plate 14 for removal of the dry product. A drainage duct 13, not generally used may be located above the sliding cover plate 14. In the cover 4 of the vessel 1 may be installed an exhaust duct for gas, which then flows through valve 29 and duct 30 to a heat exchanger 28. Introduction of gas may be effected through valves 25 or 26 to a blower 24. It then enters the reaction chamber through inlet 23, the opening of which is directed against the sliding cover plate 14. A high pressure gas storage tank 18 is connected via a duct 19 to a heat exchanger 20. Valves 21, 22 and 27 thus serve to control the flow rate of gas introduced into the system.

The process as performed using the preferred embodiment begins through the introduction of the suspension to be filtered by means such as a pump, not illustrated, into the reaction vessel through duct 9. The solid residue is deposited on the filter candles 12, while the filtrate runs from the center of the filter candles into the collector head 11, through duct 10 and valve 16. After passage of the filtrable solution is completed, the residue is dried on the filter candles themselves by the passage of warm air or other gas through the system in the direction of filtration. To this end, the gas passes from the tank 18 over duct 19 and the heating element 20, then through valves 21 and 22. Through duct 23 it enters the filtration vessel 1 and passes through the filter candles 12. The moisture-laden gas leaves the system through valve 31 after passage through collector head 11 and duct 10. The residue on the filter candles 12 which has been dried is blown off the filter candles through either continuous or discontinuous air currents from valve 17. This partially dried material falls to the bottom of the conical portion of the reaction vessel.

A further drying may be effected in this conical portion of the filtration vessel. Warmed circulating gas or air through valve 25 or fresh air through valve 26 may be introduced into the filtration chamber 1 through duct 23 after passage through blower 24 and valves 27 and 22. Since the opening of duct 23 is directed against the bottom of the chamber, the material which has fallen off the filter candles 12 is whirled up. In this process, a further drying takes place, which is advantageous on account of the great thickness of the residue layer.

The gas used for drying can be recirculated by the blower 24, either after passing through the filter candles 12 or through duct 15 and valve 29, in either case passing through the heat exchanger 28. The recirculation of the gas without passing through the filter candles is possible on account of the special manner in which the candles are attached to the collector head 11 and is effected by closing valves 16, 17 and 31.

Before heating, the gas used in the drying process can itself be dried, either through absorption or through condensation of the moisture content. The gas may also be separated into various separate streams by passing it through a gas sieve or perforated plate.

It will be understood that each of the elements described above, or two or more together, may also find a useful application in other types of constructions differing from the types described above.

While the invention has been illustrated and described as embodied in a process for drying filtration residue, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for drying wet filter residue in a filter comprising a filtration vessel, at least one vertical filter element which receives said residue during filtration, an inlet and an outlet for a substance to be filtered and a duct in a lower portion of said filtration vessel to introduce a drying gas into said filtration vessel, the process including: passing the drying gas introduced into said vessel after the filtration is completed through said filter element in a direction of filtration to dry said residue, mechanically removing said dried residue from said filter element by gas inserted into said vessel and flowing in a downward direction whereby said dried residue is collected in said lower portion of said vessel; and introducing a drying gas into said lower portion of said vessel whereby the residue collected in said lower portion of said vessel is whirled up and dried.

2. A process as defined in claim 1, wherein said drying gas is air or a chemically inert gas.

3. A process as defined in claim 1, wherein said drying gas is dried prior to use by a condensation process.

4. A process as defined in claim 1, wherein said drying gas is dried prior to use by an absorption process.

5. A process as defined in claim 1, wherein said drying gas is warmed prior to introducing into said filtration vessel by means of heat exchanger.

6. A process as defined in claim 5, wherein said drying gas is circulated through a system comprising said filtration vessel and said heat exchanger.

7. A process as defined in claim 6, wherein said drying gas is circulated out of said filtration vessel through said filter elements.

8. A process as defined in claim 1, wherein said drying gas is separated into streams after introduction of said gas into said lower portion of said filtration vessel by means of a sieve or perforated plate.

* * * * *